United States Patent [19]
Takeuchi et al.

[11] Patent Number: 6,108,479
[45] Date of Patent: Aug. 22, 2000

[54] OPTICAL WAVEGUIDE PLATE FOR DISPLAY

[75] Inventors: Yukihisa Takeuchi, Nishikamo-gun; Tsutomu Nanataki, Toyoake, both of Japan

[73] Assignee: NGK Insulators, Ltd., Japan

[21] Appl. No.: 09/046,395

[22] Filed: Mar. 23, 1998

[30] Foreign Application Priority Data

May 7, 1997 [JP] Japan .................................. 9-117196

[51] Int. Cl.[7] .............................. G02B 6/10; G09G 3/34
[52] U.S. Cl. ........................... 385/129; 345/85; 385/901
[58] Field of Search .................................. 385/129–131, 385/19, 14, 8, 901; 345/85, 30, 55, 84

[56] References Cited

U.S. PATENT DOCUMENTS

| | | | |
|---|---|---|---|
| 2,565,514 | 8/1951 | Pajes | 359/276 |
| 2,997,922 | 8/1961 | Kaprelian | 359/222 |
| 3,376,092 | 4/1968 | Kushner et al. | 359/222 |
| 3,491,245 | 1/1970 | Hardesty | 385/129 |
| 3,698,793 | 10/1972 | Tellerman | 359/290 |
| 4,113,360 | 9/1978 | Baur et al. | 350/285 |
| 4,685,766 | 8/1987 | Nishimura et al. | 350/96.32 |
| 5,052,777 | 10/1991 | Ninnis et al. | 385/19 |
| 5,070,431 | 12/1991 | Kitazawa et al. | 362/31 |
| 5,319,491 | 6/1994 | Selbrede | 359/291 |
| 5,600,197 | 2/1997 | Takeuchi et al. | 310/328 |
| 5,636,072 | 6/1997 | Shibata et al. | 359/896 |
| 5,771,321 | 6/1998 | Stern | 385/31 |
| 5,774,257 | 6/1998 | Shibata et al. | 359/291 |
| 5,862,275 | 1/1999 | Takeuchi et al. | 385/19 |
| 5,953,469 | 9/1999 | Zhou | 385/22 |

FOREIGN PATENT DOCUMENTS

| | | |
|---|---|---|
| 0 675 477 | 10/1995 | European Pat. Off. . |
| 4-191704 | 7/1992 | Japan . |
| 07287176 | 10/1995 | Japan . |

Primary Examiner—John D. Lee
Attorney, Agent, or Firm—Wall Marjama Bilinski & Burr

[57] ABSTRACT

An optical waveguide plate comprises joining layers (adhesive layers) formed on both surfaces of a main optical waveguide plate body, and rigid transparent plates thinner than the main optical waveguide plate body joined (glued) onto the joining layers. The main optical waveguide plate body is composed of, for example, a transparent material such as an acrylic resin. For example, a white glass plate or an inexpensive colored glass plate may be used for the rigid transparent plate. The optical refractive index m of the joining layer is approximately the same as the optical refractive index $n_1$ of the main optical waveguide plate body, which is in a range of $0.8n_1 \leq m \leq 1.2n_1$. Accordingly, it is possible to increase the rigidity of the optical waveguide plate, reduce the warpage or the like, and easily and inexpensively respond to a large-sized display screen of the display.

6 Claims, 6 Drawing Sheets

$n_2 > n_1$ $n_2 < n_1$ $n_0 < n_1 < n_2 < m$

F I G. 10
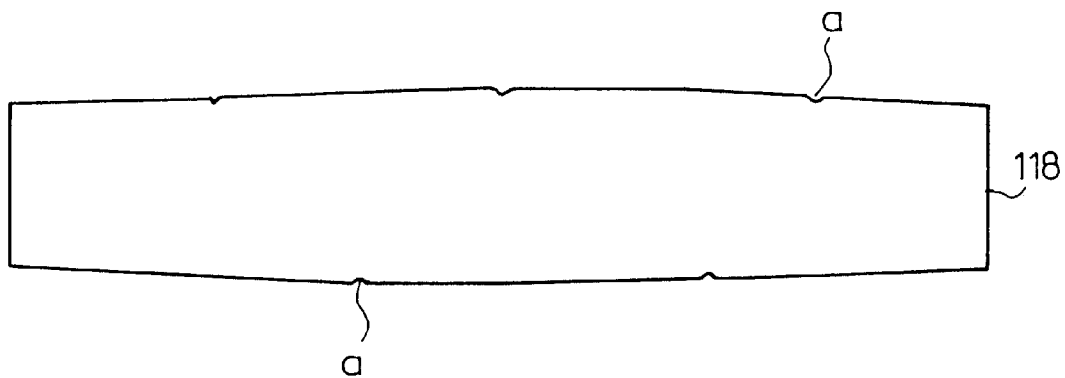

OPTICAL WAVEGUIDE PLATE FOR DISPLAY

BACKGROUND OF THE INVENTION

1. Field of the Invention

The present invention relates to an optical waveguide plate to be used for a display which consumes less electric power, and which has large screen brightness. In particular, the present invention relates to a structure of the optical waveguide plate to be used for the display for displaying, on a display surface of the optical waveguide plate, a picture image corresponding to an image signal by controlling leakage light at a predetermined position on the optical waveguide plate by controlling the displacement action of an actuator element in a direction to make contact or separation with respect to the optical waveguide plate in accordance with an attribute of the image signal to be inputted.

2. Description of the Related Art

Those hitherto known types of display include, for example, cathode ray tubes (CRT) and liquid crystal display devices.

Those types of displayes known types of cathode ray tube include, for example, ordinary television receivers and monitor units for computers. Although the cathode ray tube has a bright screen, it consumes a large amount of electric power. Further, the cathode ray tube involves a problem that the depth of the entire display device is large as compared with the size of the screen.

On the other hand, the liquid crystal display device is advantageous in that the entire device can be miniaturized, and the display device consumes a small amount of electric power. However, the liquid crystal display device involves problems in that it is inferior in brightness of the screen, and the field angle of the screen is narrow.

In the case of the cathode ray tube and the liquid crystal display device, it is necessary for a color screen to use a number of picture elements (image pixels) which is three times a number of picture elements used in a black-and-white screen. For this reason, other problems occur in that the device itself is complicated, a great deal of electric power is consumed, and it is inevitable to increase the cost.

In order to solve the problems described above, the present applicant has suggested a novel display (see, for example, Japanese Laid-Open Patent Publication No. 7-287176). As shown in FIG. 9, this display includes actuator elements 100 arranged for respective picture elements. Each of the actuator elements 100 comprises a main actuator element 108 including a piezoelectric/electrostrictive layer 102 and an upper electrode 104 and a lower electrode 106 formed on upper and lower surfaces of the piezoelectric/electrostrictive layer 102 respectively, and a substrate 114 including a vibrating section 110 and a fixed section 112 disposed under the main actuator element 108. The lower electrode 106 of the main actuator element 108 contacts with the vibrating section 110. The main actuator element 108 is supported by the vibrating section 110.

The substrate 114 is composed of a ceramic in which the vibrating section 110 and the fixed section 112 are integrated into one unit. A recess 116 is formed in the substrate 114 so that the vibrating section 110 is thin-walled.

A displacement-transmitting section 120 for obtaining a predetermined size of contact area with an optical waveguide plate 118 is connected with the upper electrode 104 of the main actuator element 108. In the illustrative display shown in FIG. 9, the displacement-transmitting section 120 is arranged such that it is located closely near to the optical waveguide plate 118 in the ordinary state in which the actuator element 100 stands still, while it contacts with the optical waveguide plate 118 in the excited state at a distance of not more than the wavelength of the light.

The light 122 is introduced, for example, from a lateral end of the optical waveguide plate 118. In this arrangement, all of the light 122 is totally reflected at the inside of the optical waveguide plate 118 without being transmitted through front and back surfaces thereof by controlling the magnitude of the refractive index of the optical waveguide plate 118. In this state, a voltage signal corresponding to an attribute of an image signal is selectively applied to the actuator element 100 by the aid of the upper electrode 104 and the lower electrode 106 so that the actuator element 100 is allowed to make displacement in conformity with the ordinary state and the excited state. Thus, the displacement-transmitting section 120 is controlled for its contact and separation with respect to the optical waveguide plate 118. Accordingly, the scattered light (leakage light) 124 is controlled at a predetermined portion of the optical waveguide plate 118, and a picture image corresponding to the image signal is displayed on the optical waveguide plate 118.

The display described above is advantageous, for example, in that (1) it is possible to decrease the electric power consumption, (2) it is possible to increase the screen brightness, and (3) it is unnecessary to increase the number of picture elements as compared with the black-and-white screen when the display is allowed to have a color screen.

By the way, the optical waveguide plate 118 included in the display is composed of a transparent material such as glass and acrylic resin, because it is necessary that the light 122 introduced from a light source 126 is totally reflected.

When the optical waveguide plate 118 is composed of glass, there is no problem in the case of a small-sized display screen of the display. However, when the display screen has a large size, problems occur in that the weight of the optical waveguide plate 118 is increased, and the glass is expensive. A method may be conceived, in which the optical waveguide plate 118 is made to be thin. However, a thin optical waveguide plate 118 causes other problems that it is difficult to introduce the light 122, and the display brightness becomes nonuniform (the central portion becomes dark).

In order to solve the problems described above, it is conceived that a transparent material having a light weight such as an acrylic resin is used for the optical waveguide plate 118.

However, as shown in FIG. 10, when the optical waveguide plate 118 is composed of an acrylic resin material, the surface tends to suffer scratches "a". Further, such an optical waveguide plate 118 is insufficient in rigidity as compared with the glass plate, and hence waviness and warpage are apt to occur, making it impossible for such an optical waveguide plate 118 to be applied to a large-sized display.

SUMMARY OF THE INVENTION

The present invention has been made taking the foregoing problems into consideration, an object of which is to provide an optical waveguide plate for a display which makes it possible to increase the rigidity of the optical waveguide plate, reduce the warpage or the like, and easily and inexpensively respond to a large-sized display screen of the display.

At first, it is premised that an optical waveguide plate for a display according to the present invention is used for the display comprising a driving section including a number of actuator elements arranged corresponding to a large number of picture elements, in particular the display for displaying, on a display surface of the optical waveguide plate, a picture image corresponding to an image signal by controlling leakage light at a predetermined portion of the optical waveguide plate by controlling displacement action of each of the actuator elements in a direction to make contact or separation with respect to the optical waveguide plate in accordance with an attribute of the image signal to be inputted.

The optical waveguide plate for the display according to the present invention is constructed such that a rigid transparent plate is laminated to at least one surface of a main optical waveguide plate body into which the light from a light source is introduced, via a transparent joining layer which has substantially the same optical refractive index as that of the optical waveguide plate.

Accordingly, even when the main optical waveguide plate body is made of a material having a light weight such as an acrylic resin, the flatness and the smoothness of the optical waveguide plate are improved, and the rigidity is simultaneously improved, because the rigid transparent plate is laminated to the surface of the main optical waveguide plate body via the joining layer. Thus, for example, the waviness and the warpage are reduced. As a result, the optical waveguide plate for the display according to the present invention is easily applicable to displays having large-sized display screens. In the present invention, a white glass plate can be used for the rigid transparent plate. Further, an inexpensive colored glass plate can be also used. Therefore, a large-sized display surface can be realized inexpensively as described above.

It is desirable to satisfy $5t_2 \leq t_1 \leq 500t_2$ provided that the main optical waveguide plate body has a thickness of $t_1$, and the rigid transparent plate has a thickness of $t_2$, in consideration of the weight, the transmittance of visible light, and the price. When a colored glass plate is used for the rigid transparent plate, it is desirable to set the thicknesses $t_1$ and $t_2$ to be $10t_2 \leq t_1 \leq 500t_2$ so that the optical path passing through the glass plate is short, in order to avoid discrepancy of an objective color of light and to avoid loss due to the absorption of light.

The reason why the optical refractive index of the joining layer is approximately the same as the optical refractive index of the main optical waveguide plate body is that it is intended to reduce reflection and scattering of light at the interface between the main optical waveguide plate body and the joining layer. In the present invention, it is preferable that an optical refractive index m of the joining layer satisfies $0.8n_1 \leq m \leq 1.2n_1$, more desirably $0.9n_1 \leq m \leq 1.1n_1$ provided that an optical refractive index of the main optical waveguide plate body is $n_1$. Further, it is preferable that the optical refractive index m of the joining layer satisfies $0.8n_2 \leq m \leq 1.2n_2$, more desirably $0.9n_2 \leq m \leq 1.1n_2$ provided that an optical refractive index of the rigid transparent plate is $n_2$.

Accordingly, for example, the waviness and the warpage are reduced, so it is possible to reduce the occurrence of leakage light which would be otherwise caused at portions (non-display portions) which are not intended to effect light emission, and it is possible to improve the brightness at portions which are intended to effect light emission. Thus, it is possible to improve the contrast (ratio between the brightness of the display portion and the brightness of the non-display portion) of the display.

Moreover, the light component (leakage component), which has been hitherto leaked due to, for example, the scratch and the dirt existing on the surface of the main optical waveguide plate body, is reduced owing to the presence of the joining layer. Simultaneously, the light corresponding to the amount of reduction is utilized for light emission effected at the portions (display portions) which are intended to effect light emission. Therefore, the brightness of the display is improved as well.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 illustrates the inconvenience which occurs when an optical waveguide plate is composed of an acrylic resin material.

DESCRIPTION OF THE PREFERRED EMBODIMENTS

Illustrative embodiments of the optical waveguide plate for the display according to the present invention (hereinafter simply referred to as "optical waveguide plate according to the embodiment") will be explained below with reference to FIGS. 1 to 8. Prior thereto, explanation will be made with reference to FIG. 1 for the arrangement of the display D to which the optical waveguide plate according to the embodiment of the present invention is applied.

Figure 1:
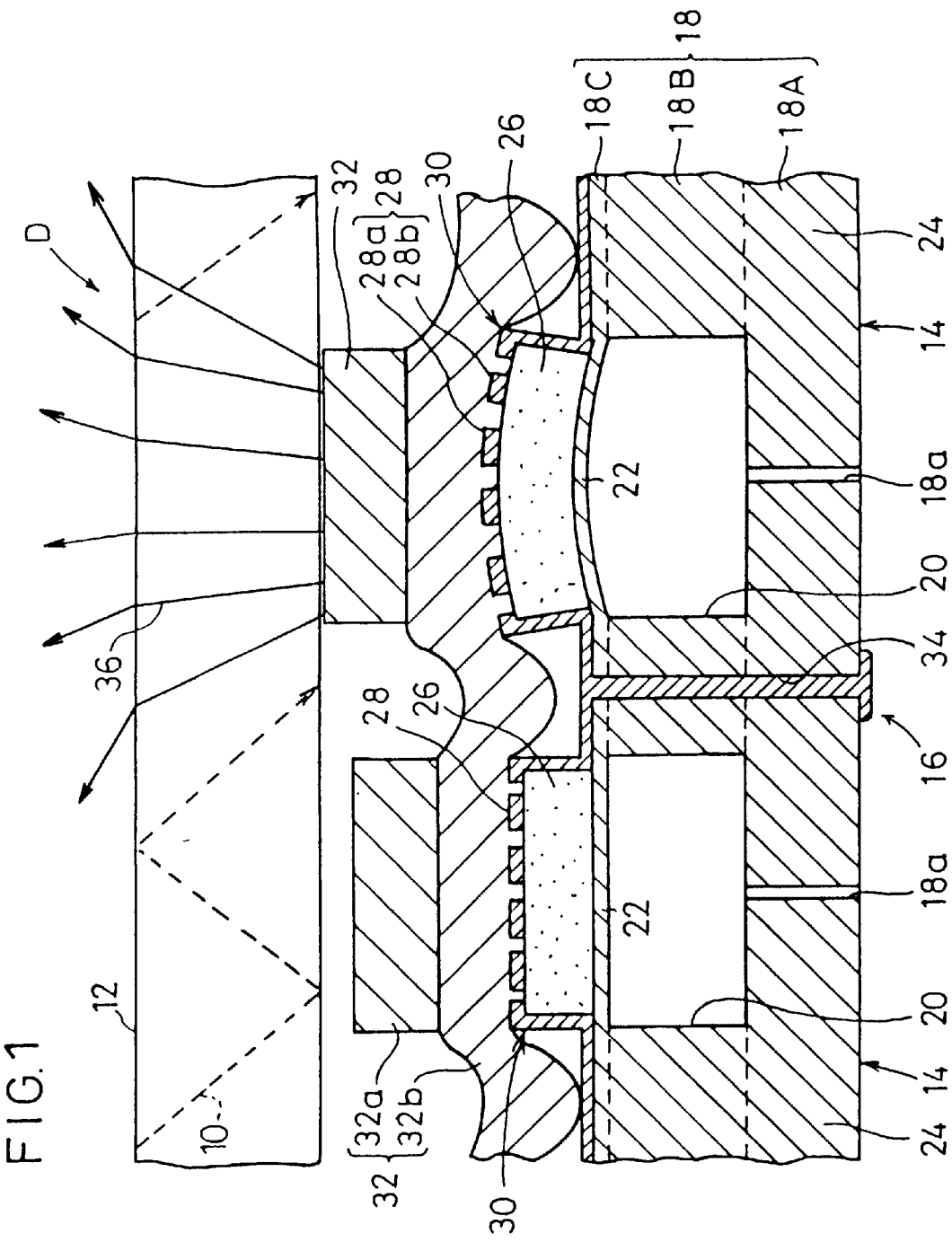
FIG. 1 shows a cross-sectional arrangement illustrating a display to which an optical waveguide plate according to the an embodiment of the present invention is applied.

As shown in FIG. 1, the display D comprises an optical waveguide plate 12 according to the embodiment of the present invention for introducing light 10 thereinto, and a driving section 16 provided opposingly to the back surface of the optical waveguide plate 12 and including a large number of actuator elements 14 which are arranged in a matrix configuration or in a zigzag configuration corresponding to picture elements (image pixels).

The driving section 16 includes a substrate 18 composed of, for example, a ceramic. The actuator elements 14 are arranged at positions corresponding to the respective picture elements on the substrate 18. The substrate 18 has its first principal surface which is arranged opposite the back surface of the optical waveguide plate 12. The first principal surface is a continuous surface (flushed surface). Hollow spaces 20 for forming respective vibrating sections as described later on are provided at positions corresponding to the respective picture elements at the inside of the substrate 18. The respective hollow spaces 20 communicate with the outside via through-holes 18a each having a small diameter and provided at a second principal surface of the substrate 18.

The portion of the substrate 18, at which the hollow space 20 is formed, is thin-walled. The other portion of the substrate 18 is thick-walled. The thin-walled portion has a structure which tends to undergo vibration in response to external stress, and it functions as a vibrating section 22. The portion other than the hollow space 20 is thick-walled, and it functions as a fixed section 24 for supporting the vibrating section 22.

That is, the substrate 18 has a stacked structure comprising a substrate layer 18A as a lowermost layer, a spacer layer 18B as an intermediate layer, and a thin plate layer 18C as an uppermost layer. The substrate 18 can be recognized as an integrated structure including the hollow spaces 20 formed at the positions in the spacer layer 18B corresponding to the picture elements. The substrate layer 18A functions as a substrate for reinforcement, as well as a substrate for wiring. The substrate 18 may be sintered in an integrated manner, or it may be additionally attached.

As shown in FIG. 1, each of the actuator elements 14 comprises the vibrating section 22 and the fixed section 24 described above, as well as a main actuator element 30 including a shape-retaining layer 26 composed of, for example, a piezoelectric/electrostrictive layer or an anti-ferroelectric layer directly formed on the vibrating section 22 and a pair of electrodes 28 (a row electrode 28a and a column electrode 28b) formed on an upper surface of the shape-retaining layer 26, and a displacement-transmitting section 32 connected onto the main actuator element 30, for increasing the contact area with respect to the optical waveguide plate 12 to obtain an area corresponding to the picture element.

That is, the display D has a structure in which the main actuator elements 30 comprising the shape-retaining layers 26 and the pairs of electrodes 28 are formed on the substrate 18. The pair of electrodes 28 may have a structure in which they are formed on upper and lower sides of the shape-retaining layer 26, or are formed on only one side of the shape-retaining layer 26. However, in order to advantageously join the substrate 18 and the shape-retaining layer 26, it is preferable that the pair of electrodes 28 are formed only on the upper side (the side opposite to the substrate 18) of the shape-retaining layer 26 so that the substrate 18 directly contacts with the shape-retaining layer 26 without any difference in height, as in the display D. In the illustrative arrangement shown in FIG. 1, for example, the row electrode 28a is led to the back surface side of the substrate 18 through the through-hole 34.

Next, the operation of the display D constructed as described above will be briefly described with reference to FIG. 1. At first, the light 10 is introduced, for example, from the end portion of the optical waveguide plate 12. In this embodiment, all of the light 10 is totally reflected at the inside of the optical waveguide plate 12 without being transmitted through the front and back surfaces thereof by controlling the magnitude of the refractive index of the optical waveguide plate 12. In this state, when a certain actuator element 14 is in the selected state, and the displacement-transmitting section 32 corresponding to the actuator element 14 contacts, at a distance of not more than the wavelength of light, with the back surface of the optical waveguide plate 12, then the light 10, which has been subjected to total reflection, is transmitted to the surface of the displacement-transmitting section 32 contacting with the back surface of the optical waveguide plate 12.

The displacement-transmitting section 32 reflects the light transmitted through the back surface of the optical waveguide plate 12, and increases the contact area with respect to the optical waveguide plate 12 so that it is not less than a predetermined size. That is, the light emission area is determined by the contact area between the displacement-transmitting section 32 and the optical waveguide plate 12.

In the display D described above, the displacement-transmitting section 32 includes a plate member 32a for determining the substantial light emission area, and a displacement-transmitting member 32b for transmitting the displacement of the main actuator element 30 to the plate member 32a.

The contact between the displacement-transmitting section 32 and the optical waveguide plate 12 means that the displacement-transmitting section 32 and the optical waveguide plate 12 are positioned at a distance of not more than the wavelength of the light 10 (light 10 introduced into the optical waveguide plate 12).

Once the light 10 arrives at the surface of the displacement-transmitting section 32, the light 10 is reflected by the surface of the displacement-transmitting section 32, and it behaves as scattered light 36. A part of the scattered light 36 is reflected again in the optical waveguide plate 12. However, almost all of the scattered light 36 is not reflected by the optical waveguide plate 12, and is transmitted through the front surface of the optical waveguide plate 12. The displacement-transmitting section 32 makes contact with the back surface of the optical waveguide plate 12 corresponding to the bending displacement of the main actuator element 30. When the displacement-transmitting section 32 contacts with the back surface of the optical waveguide plate 12, for example, the light 10, which has been totally reflected at the inside of the optical waveguide plate 12, is transmitted through the back surface of the optical waveguide plate 12. The light 10 is transmitted to the surface of the displacement-transmitting section 32, and is reflected by the surface of the displacement-transmitting section 32. Accordingly, the picture element corresponding to the actuator element 14 is in the ON state.

That is, the presence or absence of light emission (leakage light) at the front surface of the optical waveguide plate 12 can be controlled depending on the presence or absence of the contact of the displacement-transmitting section 32 disposed at the back of the optical waveguide plate 12. Especially, in the display device according to the embodiment of the present invention, one unit for making the displacement action of the displacement-transmitting section 32 in the direction to make contact or separation with respect to the optical waveguide plate 12 is regarded as one picture element. A large number of the picture elements are arranged in a matrix configuration or in a zigzag configuration concerning the respective rows. Therefore, it is possible to display a picture image (characters and graphics) corresponding to the image signal on the front surface of the optical waveguide plate, i.e., on the display screen, in the same manner as the cathode ray tube, the liquid crystal display device, and the plasma display by controlling the displacement action in each of the picture elements in accordance with the attribute of the inputted image signal.

Figure 2:
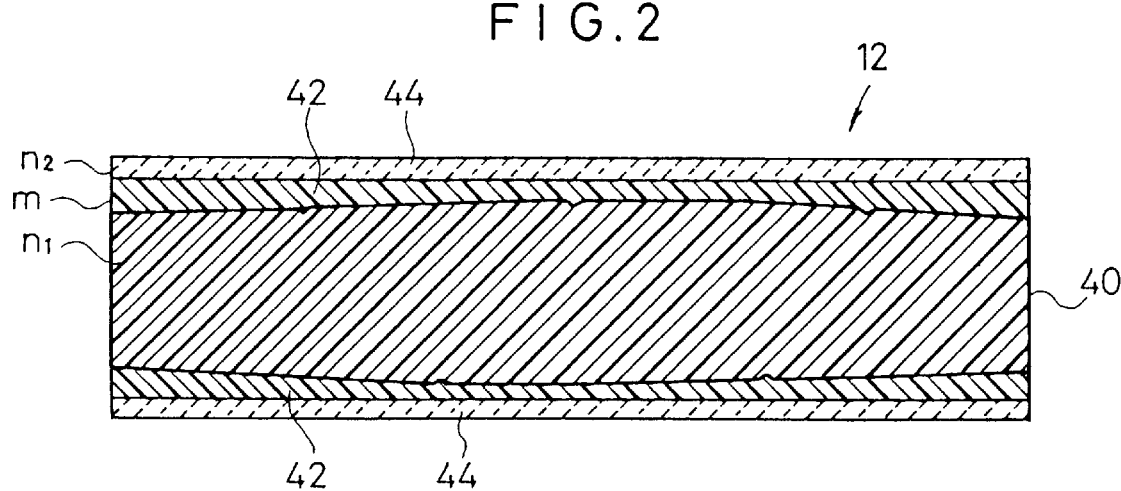
FIG. 2 shows a cross-sectional arrangement illustrating the optical waveguide plate according to the embodiment of the present invention.

As shown in FIG. 2, an optical waveguide plate 12 according to the embodiment of the present invention comprises joining layers (adhesive layers) 42 which are formed on both surfaces of a main optical waveguide plate body 40, and rigid transparent plates 44 which are thinner than the main optical waveguide plate body 40 and which are joined (glued) onto the joining layers 42. The main optical waveguide plate body 40 is composed of, for example, a transparent material such as an acrylic resin. Those usable as the rigid transparent plate 44 include, for example, white glass plates and inexpensive colored glass plates.

In this embodiment, the main optical waveguide plate body 40 has a thickness $t_1$ of about 10 mm to 200 mm. The rigid transparent plate 44 has a thickness $t_2$ of about 0.1 mm to 3 mm. On this assumption, it is desirable to give $5t_2 \leq t_1 \leq 500t_2$. When the colored glass plate is used as the rigid transparent plate 44, it is desirable to set the thicknesses $t_1$ and $t_2$ to satisfy $10t_2 \leq t_1 \leq 500t_2$ so that the optical path of the light passing through the glass plate is short to avoid a discrepancy in the objective color of the light and to avoid loss due to the absorption of light.

The optical refractive index m of the joining layer 42 is approximately the same as the optical refractive index $n_1$ of the main optical waveguide plate body 40. It is desirable to satisfy $0.8n_1 \leq m \leq 1.2n_1$, and more preferably $0.9n_1 \leq m \leq 1.1n_1$. In relation to the optical refractive index $n_2$ of the rigid transparent plate 44, it is desirable to satisfy $0.8n_2 \leq m \leq 1.2n_2$, and more preferably $0.9n_2 \leq m \leq 1.1n_2$.

Figure 3:
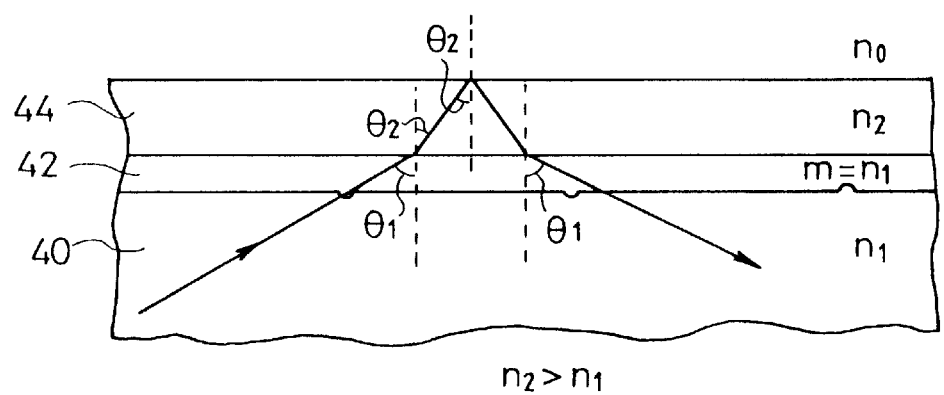
FIG. 3 illustrates an optical path obtained in the case of the use of a rigid transparent plate which has its optical refractive index $n_2$ larger than the optical refractive index $n_1$ of the main optical waveguide plate body.
Figure 4:
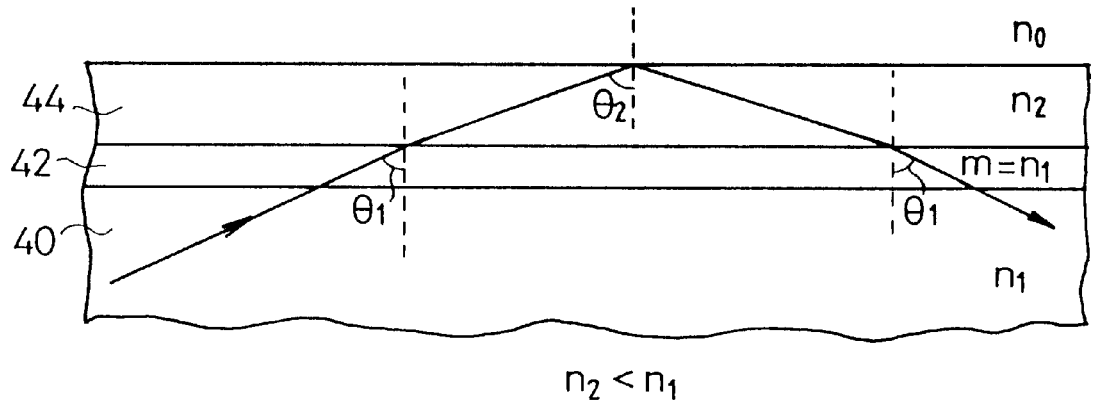
FIG. 4 illustrates an optical path obtained in the case of the use of a rigid transparent plate which has its optical refractive index $n_2$ smaller than the optical refractive index $n_1$ of the main optical waveguide plate body.

In this embodiment, for example, the optical path followed in the optical waveguide plate 12 is represented by optical paths shown in FIGS. 3 and 4. FIGS. 3 and 4 are depicted assuming that the optical refractive indexes of the main optical waveguide plate body 40, the joining layer 42, the rigid transparent plate 44, and the external space are $n_1$, m (=$n_1$), $n_2$, and $n_0$ (air=1.0) respectively.

The embodiment shown in FIG. 3 illustrates an example of the use of a rigid transparent plate 44 having its optical refractive index $n_2$ which is larger than the optical refractive index $n_1$ of the main optical waveguide plate body 40. All of the light on the optical path, which satisfies the condition described below, is totally reflected by the interface between the rigid transparent plate 44 and the external space, so the light returns to the main optical waveguide plate body 40.

The optical path which satisfies the condition is the optical path other than the optical paths along which the light scattered from the light emission portion (display portion) follows, i.e., the optical path along which the light not intended to effect leakage to the outside follows. Specifically, the optical path is represented by an optical path in which the angle of incidence $\theta_1$ into the interface between the joining layer 42 and the rigid transparent plate 44 is not less than a critical angle $\theta c_{10}$, and the angle of outgoing radiation $\theta_2$ from the interface is not less than a critical angle $\theta c_{20}$.

It is noted that:

critical angle $\theta c_{10} = \sin^{-1} (n_0/n_1)$; and critical angle $\theta c_{20} = \sin^{-1} (n_0/n_2)$.

The embodiment shown in FIG. 4 illustrates an example of the use of a rigid transparent plate 44 having its optical refractive index $n_2$ which is smaller than the optical refractive index $n_1$ of the main optical waveguide plate body 40. Also in this case, all of the light on the optical path which satisfies the condition described above, i.e., the light which follows the optical path and which is not intended to cause leakage to the outside, is totally reflected by the interface between the rigid transparent plate 44 so the external space, and the light returns to the main optical waveguide plate body 40.

Figure 5:
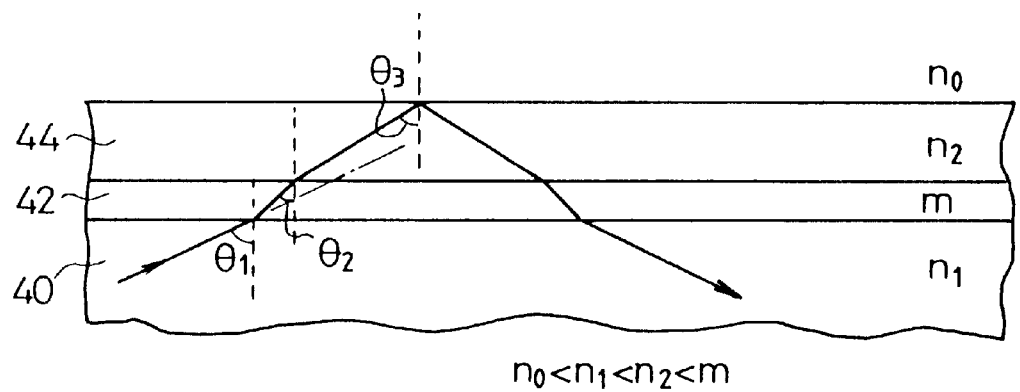
FIG. 5 illustrates a condition for totally reflecting the light not intended to effect leakage to the outside, at a boundary between a rigid transparent plate and the external space, when an optical refractive index of a joining layer is different from an optical refractive index of a main optical waveguide plate body.

In the embodiment described above, it has been demonstrated that when the optical refractive index m of the joining layer 42 is approximately the same as the optical refractive index $n_1$ of the main optical waveguide plate body 40, the light which is not intended to cause leakage to the outside is totally reflected by the interface between the rigid transparent plate 44 and the external space. However, as shown in FIG. 5, even when the optical refractive index m of the joining layer 42 is different from the optical refractive index $n_1$ of the main optical waveguide plate body 40 (m≠$n_1$), the light which is not intended to cause leakage to the outside can be totally reflected by the interface between the rigid transparent plate 44 and the external space in the same manner as described above provided that the relative magnitudes of the optical refractive indices satisfy $n_0 < n_1 < n_2 < m$ (wherein $\theta_2 < \theta_3 < \theta_1$).

However, when the optical refractive index m of the joining layer 42 is excessively large compared with the optical refractive index $n_1$ of the main optical waveguide plate body 40 and the optical refractive index $n_2$ of the rigid transparent plate 44, the catoptric light is generated at the interface between the main optical waveguide plate body 40 and the joining layer 42 or at the interface between the rigid transparent plate 44 and the joining layer 42. For this reason, a problem arises in that the display is darkened as a whole.

Therefore, the optical refractive index m of the joining layer 42 desirably satisfies, in relation to the main optical waveguide plate body 40, the equation $0.8n_1 \geq m \geq 1.2n_1$, and preferably the equation $0.9n_1 \geq m \geq 1.1n_1$. The optical refractive index m of the joining layer 42 desirably satisfies, in relation to the rigid transparent plate 44, the equation $0.8n_2 \geq m \geq 1.2n_2$, and preferably the equation $0.9n_2 \geq m \geq 1.1n_2$.

Those materials preferably used for the joining layer 42 include resins having transparency, such as those composed of acrylic and epoxy compounds.

Figure 6:
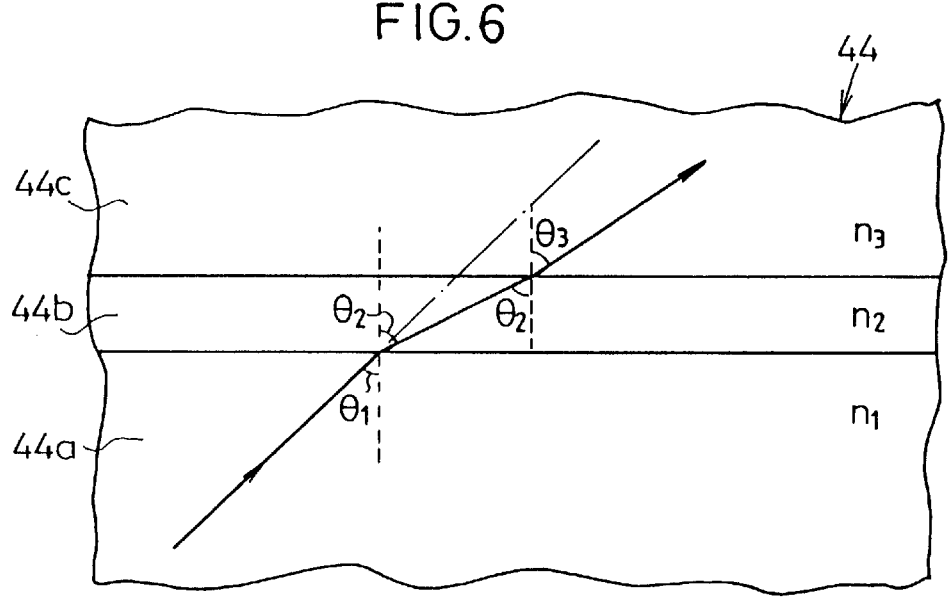
FIG. 6 illustrates a relationship between the angle of incidence and the angle of outgoing radiation, obtained when a rigid transparent plate having a three-layered structure is formed on a main optical waveguide plate body.

The relationship between the angle of incidence and the angle of outgoing radiation is shown in FIG. 6 when a rigid transparent plate 44 having a multiple-layered structure is formed on the main optical waveguide plate body 40. For example, when a rigid transparent plate 44 having a three-layered structure is exemplified, the following expressions are known according to the Snell's law, provided that the optical refractive indexes of a first layer 44a, a second layer 44b, and a third layer 44c are $n_1$, $n_2$, and $n_3$ respectively, the angle of incidence into the interface between the first layer 44a and the second layer 44b is $\theta_1$, the angle of outgoing radiation from the interface (=the angle of incidence into the interface between the second layer 44b and the third layer 44c) is $\theta_2$, and the angle of outgoing radiation from the interface between the second layer 44b and the third layer 44c is $\theta_3$.

$$n_1 \sin \theta_1 = n_2 \sin \theta_2$$

$$n_2 \sin \theta_2 = n_3 \sin \theta_3$$

Consequently, the following expressions are determined.

$$n_1 \sin \theta_1 = n_3 \sin \theta_3$$

$$\theta_3 = \sin^{-1}\{(n_1/n_3) \sin \theta_1\}$$

That is, the angle of outgoing radiation $\theta_3$ from the interface between the second layer 44b and the third layer 44c depends only on the angle of incidence $\theta_1$ into the interface between the first layer 44a and the second layer 44b, and does not depend on the optical refractive index $n_2$ of the intermediate second layer 44b. This fact is true for any rigid transparent plate 44 having four or more layers. The angle of outgoing radiation from the interface between the uppermost layer and the layer just thereunder depends only on the angle of incidence $\theta_1$ into the interface between the first layer 44a and the second layer 44b. However, it is assumed that there is no intermediate portion at which total reflection occurs, for example, at the interface between the first layer 44a and the second layer 44b and the interface between the second layer 44b and the third layer 44c. If there is any intermediate portion at which total reflection occurs, the display brightness is darkened. Therefore, it is desirable that the optical refractive indexes $n_1$, $n_2$, and m are allowed to have the same relationship as those described above.

As described above, according to the optical waveguide plate 12 in the embodiment of the present invention, the rigid transparent plates 44 are laminated to both surfaces of the main optical waveguide plate body 40 via the joining layers 42. Therefore, for example, the warpage and the waviness are absorbed by the intervening joining layer 42 and the optical waveguide plate 12 has high flatness as a whole. Further, the presence of the rigid transparent plate 44 improves the rigidity of the optical waveguide plate 12. Accordingly, the optical waveguide plate 12 can be easily applied to a large-sized display screen of the display D. According to the present invention, a white glass plate can be used for the rigid transparent plate 44. An inexpensive colored glass plate can be also used. Therefore, the large-sized display screen can be realized inexpensively.

Further, the rigid transparent plate 44 scarcely suffers from scratches as compared with the main optical waveguide plate body 40. Therefore, the formation of scratches is reduced on the display surface of the optical waveguide plate 12. Accordingly, it is possible to reduce any excessive light emission (false light emission) at the non-display portion, and it is possible to improve the contrast and the brightness of the display D.

Figure 7:
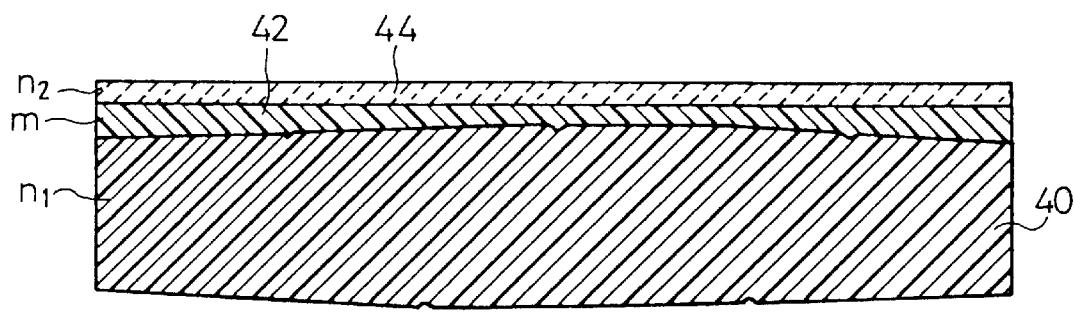
FIG. 7 shows a cross-sectional arrangement of another illustrative optical waveguide plate concerning the embodiment of the present invention.

In the embodiment described above, the rigid transparent plates 44 are laminated to the both surfaces of the main optical waveguide plate body 40 via the joining layers 42 respectively. However, it is not necessarily indispensable to form the rigid transparent plate 44 on the surface of the side of the driving section. For example, as shown in FIG. 7, the rigid transparent plate 44 may be laminated via the joining layer 44 to only the display surface (the surface on which the image is actually displayed) at the front surface of the main optical waveguide plate body 40.

Figure 8:
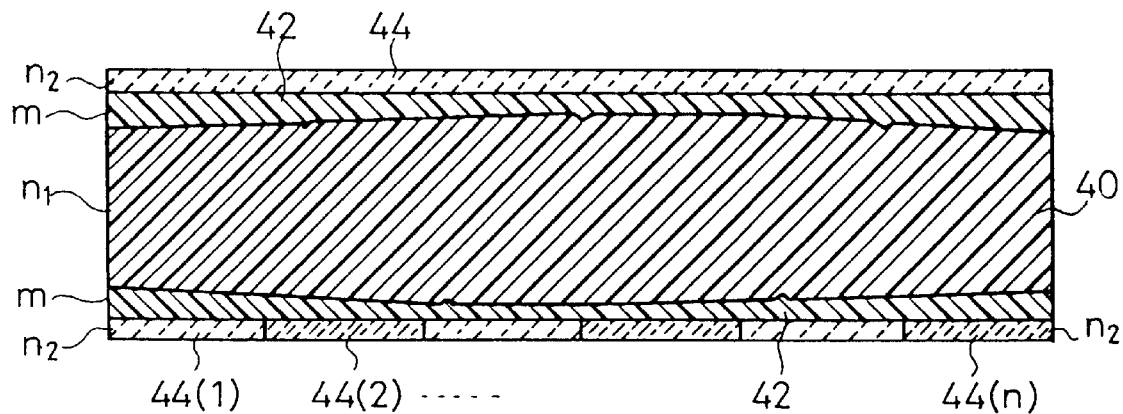
FIG. 8 shows a cross-sectional arrangement of still another illustrative optical waveguide plate concerning the embodiment of the present invention.
Figure 9:
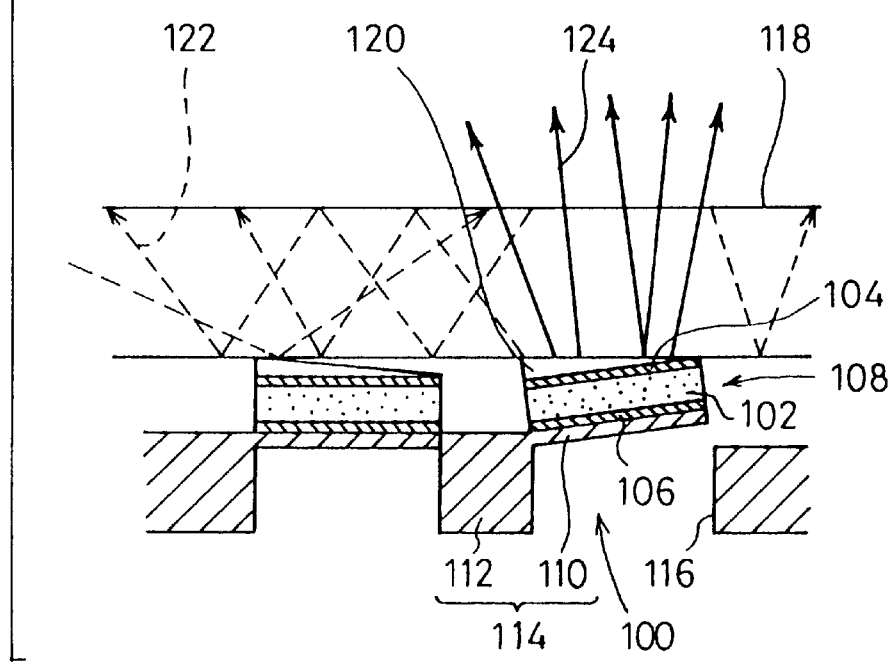
FIG. 9 shows an illustrative cross-sectional arrangement of a display hitherto suggested by the present applicant.

Alternatively, as shown in FIG. 8, the rigid transparent plate 44, which is laminated on one surface of the rigid transparent plates 44 laminated on both surfaces of the main optical waveguide plate body 40, may be composed of a plurality of small-sized rigid transparent plates 44(1) to 44(n) laminated thereto. When there are gaps between the plurality of small-sized rigid transparent plates 44(1) to 44(n), the gaps are filled with the joining layer 42. Therefore, the small-sized rigid transparent plates 44(1) to 44(n) are tightly secured to one another. In the case of this arrangement, even when the display surface is large, for example, the small-sized rigid transparent plates 44(1) to 44(n) having an identical area may be merely aligned and laminated. Therefore, it is possible to easily realize a large-sized display screen.

The optical waveguide plate for the display according to the present invention should not be interpreted such that it is limited to the embodiments described above. The optical waveguide plate for the display according to the present invention may be variously changed, corrected, and improved without deviating from the scope of the present invention.

As explained above, according to the optical waveguide plate for the display of the embodiment of the present invention, it is possible to increase the rigidity of the optical waveguide plate, reduce the warpage or the like, and easily and inexpensively respond to a large-sized display screen of the display.

What is claimed is:

1. An optical waveguide plate to be used for a display comprising said optical waveguide plate for introducing light thereinto, and a driving section provided opposingly to one plate surface of said optical waveguide plate and including a number of actuator elements arranged corresponding to a large number of picture elements, for displaying, on said optical waveguide plate, a picture image corresponding to an image signal by controlling leakage light at a predetermined portion of said optical waveguide plate by controlling displacement action of each of said actuator elements in a direction to make contact or separation with respect to said optical waveguide plate in accordance with an attribute of said image signal to be inputted, wherein:

a rigid transparent plate is laminated to at least one surface of a main optical waveguide plate body into which said light from a light source is introduced, via a joining layer which has substantially the same optical refractive index as that of said optical waveguide plate.

2. The optical waveguide plate for said display according to claim 1, wherein an optical refractive index m of said joining layer satisfies:

$$0.8n_1 \leq m \leq 1.2n_1$$

provided that an optical refractive index of said main optical waveguide plate body is $n_1$.

3. The optical waveguide plate for said display according to claim 1, wherein an optical refractive index m of said joining layer satisfies:

$$0.8n_2 \leq m \leq 1.2n_2$$

provided that an optical refractive index of said rigid transparent plate is $n_2$.

4. The optical waveguide plate for said display according to claim 1, wherein an expression is satisfied:

$$5t_2 \leq t_1 \leq 500t_2$$

provided that said main optical waveguide plate body has a thickness of $t_1$, and said rigid transparent plate has a thickness of $t_2$.

5. The optical waveguide plate for said display according to claim 4, wherein an optical refractive index m of said joining layer satisfies:

$$0.8n_1 \leq m \leq 1.2n_1$$

provided that an optical refractive index of said main optical waveguide plate body is $n_1$.

6. The optical waveguide plate for said display according to claim 4, wherein an optical refractive index m of said joining layer satisfies:

$$0.8n_2 \leq m \leq 1.2n_2$$

provided that an optical refractive index of said rigid transparent plate is $n_2$.

* * * * *